Jan. 12, 1954     D. H. RANSOM, JR     2,666,190
ECHO-RANGING AND SOUNDING SYSTEM
Filed Sept. 29, 1944                    2 Sheets-Sheet 1

INVENTOR
DAVID H. RANSOM JR.
BY
ATTORNEYS

Patented Jan. 12, 1954

2,666,190

UNITED STATES PATENT OFFICE 2,666,190

ECHO RANGING AND SOUNDING SYSTEM

David H. Ransom, Jr., San Diego, Calif.

Application September 29, 1944, Serial No. 556,451

3 Claims. (Cl. 340—3)

This invention relates to a device which utilizes sound signals for measuring distances.

When ship or aircraft operations are conducted in restricted areas where other moving or stationary objects may be present at relatively short distances, it is imperative that accurate measurement of such distances be made for safe navigation. It is further advantageous to have gear which is small and compact, without sacrificing efficiency or accuracy. In existing gear, the indicating mechanisms often require considerable space, necessitated by the fact that a large scale is usually necessary when frequent, short signals are used for measuring short distances. The present invention comprises such a measuring device provided with a novel means of indication, requiring a minimum of space.

Although the present unit may be utilized with many different types of systems, it has been found to work exceptionally well where short, high-frequency, sound pulses are used. This feature makes it possible to use the gear for warfare as well as commercial purposes, as when high-frequency (for example, 60 to 100 kc.) signal pulses are transmitted, ordinary sound gear is not sensitive in such frequency bands. Thus, the chance of detecting its signals by such ordinary gear is slight.

Because of the important function performed by such a distance measuring unit, a dependable and accurate unit is a necessity for safe operation. Any confusion resulting from or misinterpretation of the indicating mechanism is likely to bring disaster and it is thus one of the primary objects of the invention to provide a positively read mechanism. Although the unit illustrated and described in detail herein has been found successful, it is not intended to limit its application to the particular system shown. Modifications will be obvious to those skilled in the art.

The indicating mechanism, in general, consists of a cathode-ray oscilloscope (CRO), and may conveniently be a 3" type or smaller. The electronic control circuits are so arranged that the echo indications may be adjusted to the same spot on the CRO screen, regardless of the distance measured. They are further arranged to provide a sweep of constant amplitude, regardless of the distance being measured. These circuits are used in conjunction with a linear, calibrated, distance scale, on which distance may be read directly.

Figure 1:
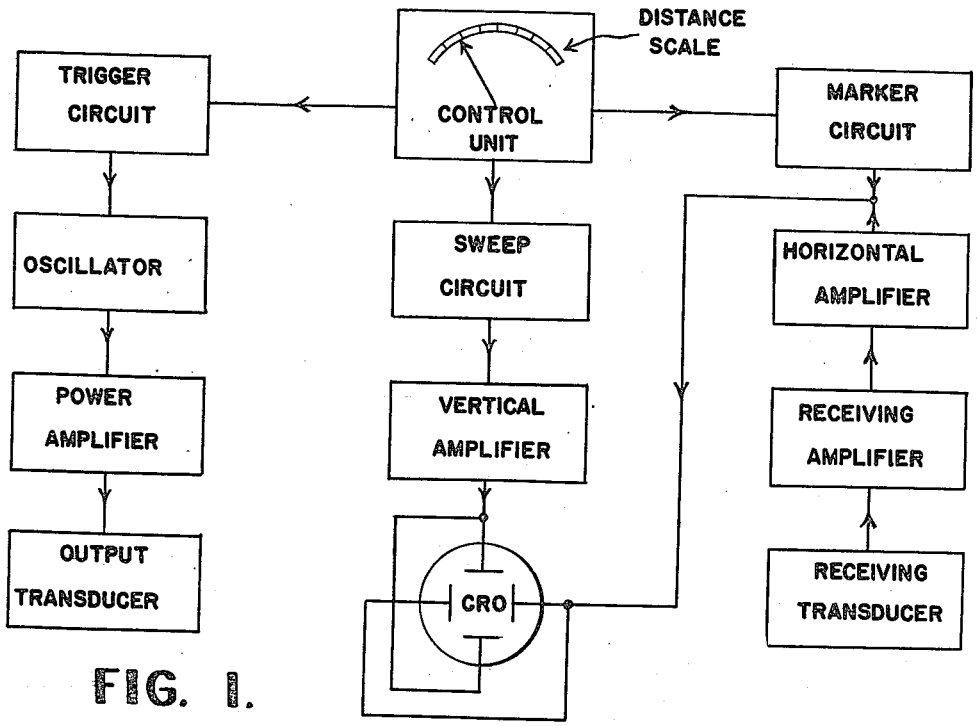
Fig. 1 is a block diagram of the invention, illustrating the general manner of operation.

A complete block diagram of the present invention is shown in Fig. 1. It comprises several conventional elements: an output transducer, a receiving transducer, a power amplifier and a receiving amplifier. When operating, short, high-frequency pulses are supplied from an oscillator to the power amplifier which drives the output transducer. The echo signals, after reflection from the target, are picked up on the receiving transducer and amplified in the receiving amplifier.

Means are also provided to synchronize the vertical sweep of the CRO with the emission of pulses. The received and amplified echo pulses are then applied to the CRO to produce horizontal deflections. Inasmuch as the sweep is synchronized with the outgoing signal, the echo appears as a stationary pip on the screen so long as the distance remains fixed. Additional means are provided to adjust the rate at which pulses are sent out, so that an echo is received simultaneously with the next outgoing pulse and thus, when proper adjustment has been obtained, the transit time (defined herein as the time taken for a pulse to travel from the output transducer to the reflecting target and back to the receiving transducer) is the same as the period between pulses. The various circuits are further synchronized to provide a sweep of constant length independent of the pulse rate.

In Fig. 1, it is seen that the oscillator applies its output, through the power amplifier, to the output transducer. These units may be of any conventional type. For example, it has been found that the oscillator may be of the push-pull, tuned-plate type using a 6SN7 tube, keyed by two parallel-connected, triode sections of another tube (6SN7), which may form part of the trigger circuit. The output of the oscillator may be resistance-coupled to the power amplifier, which may consist of a pair of beam power tubes (6L6), feeding the output transducer through a suitable transformer. The output transducer, suitably matched to the amplifier, has, in practice, been a piezo-electric, Rochelle-salt unit.

On the receiving side of the device, the echo signal is picked up on the receiving transducer and fed to the receiving amplifier. These elements likewise may be of any convenient, conventional type such as, for example, another Rochelle-salt transducer which feeds, through a transformer, to the grid of the first stage of a four stage, high-gain, amplifier. If this type amplifier is used, it has been found convenient to tune the first stage to the frequency of the emitted sound signal and then apply the signal through a second, untuned, resistance-coupled, stage to a third, tuned stage and a fourth, cathode-follower, output stage.

The CRO amplifiers, both horizontal and vertical, are also conventional. In practice, each may comprise a triode amplifier stage, resistance-coupled to a cathodyne inverter stage which feeds a pair of beam power tubes (6V6), operating in push-pull. The deflection plates of the CRO may be connected directly to the push-pull output stages which permits spot-positioning by the adjustment of potentiometers in the cathode circuits of the amplifiers. The horizontal amplifier should preferably be designed to reject frequencies substantially different from the signal frequency.

The operation of the whole circuit is generally under the control of the control unit. It, together with the sweep circuit, is shown schematically in Fig. 2, and will be subsequently described in detail. The first of these units acts as an adjustable frequency generator, and a positive grid multivibrator is used because it generates a square wave and because two outputs, 180° apart in phase, can be obtained from the two cathodes of the tubes. Additionally, its frequency may be easily varied by changing the grid bias applied to the tubes. The voltage from one of the cathodes is applied to the trigger circuit and to the horizontal deflecting plates of the CRO, through the marker circuit. The latter consists simply of a resistor and a capacitor connected, in series, directly to the horizontal deflection plates of the CRO. It thus applies a short pulse to the plates to serve as a reference mark indicating the emission of the signal.

The trigger circuit may be of the type shown in Fig. 5 of a copending application, Serial No. 511,626, filed November 24, 1943, by George A. Brettell, Jr. It comprises a biased multivibrator so arranged that one tube is normally conducting. When a pulse from the control unit is received on the non-conducting tube, conduction is transferred to that tube, raising the potential on the plate of the normally conducting tube. The plate output of this latter tube is fed to the two, parallel connected, triode sections of the tube (mentioned above) which keys the oscillator, and the length of the pulse emitted is dependent upon the RC constants of the network connecting the plate of one section of the trigger tube to the grid of the other. Thus, it is seen that a sound pulse is emitted during each cycle of operation of the control unit.

The voltage appearing across the other cathode of the multivibrator in the control unit is fed, through a differentiating network, to the grid of a gas tube to trigger the CRO sweep with each pulse. Thus, under the control of the multivibrator, the CRO spot is recycled by the firing of the gas tube.

Figure 2:
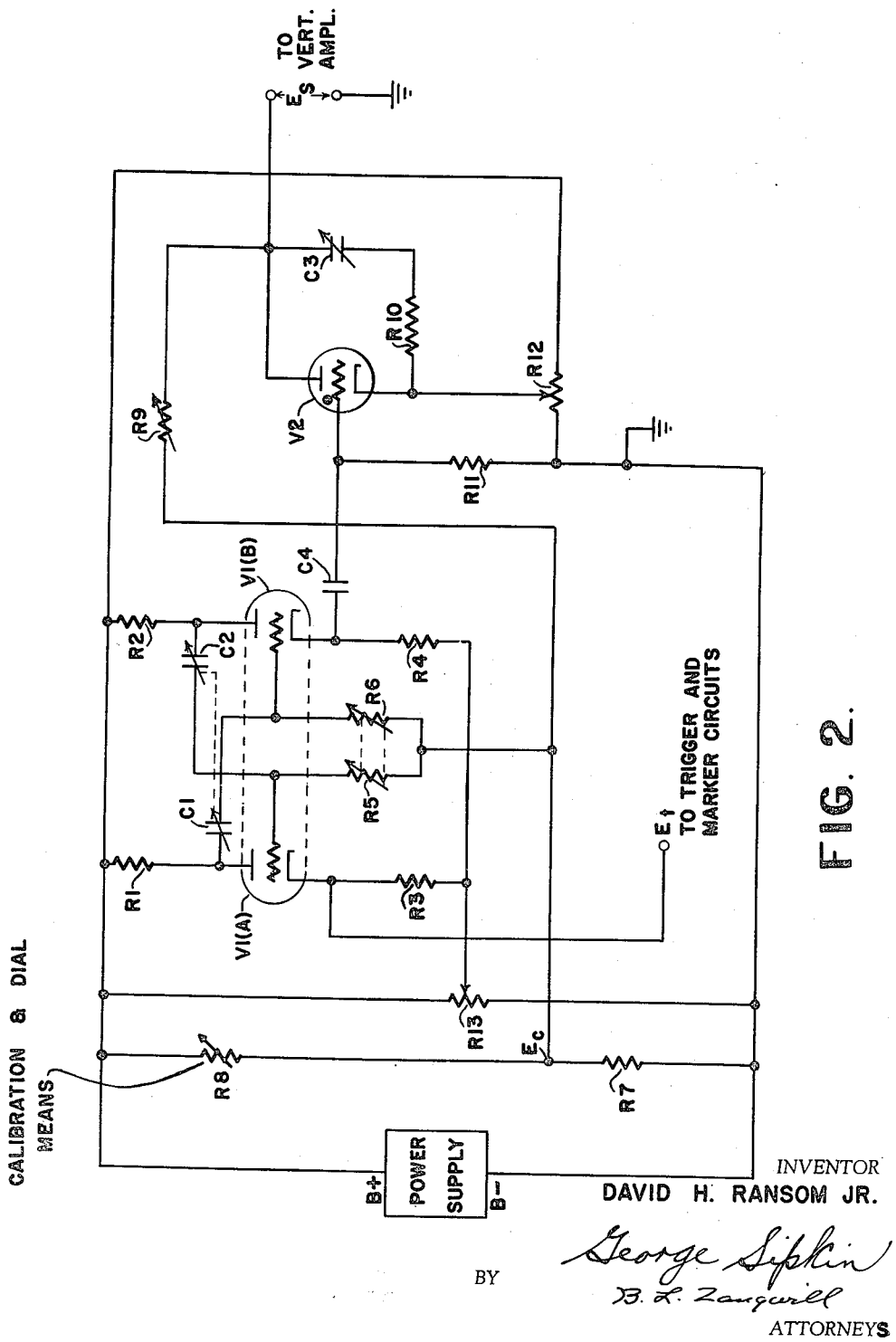
Fig. 2 is a schematic diagram showing the detailed electronic circuits included in the control unit and the sweep circuit of Fig. 1.

The control unit and sweep circuit are shown in the schematic diagram of Fig. 2. The main element of the control unit is a positive-grid multivibrator V1, comprising two halves, A and B. This tube is provided with two plate resistors R1, R2 and a pair of cathode resistors R3, R4. The conventional, inter-connecting RC networks which, together with the characteristics of tube V1, determine the frequency of operation for any given control voltage $E_c$, consist of variable condenser C1 and variable resistor R6 and a similar condenser C2 and resistor R5. The control voltage $E_c$ is obtained from a resistance network comprising resistor R7 and variable resistor R8 whereby different values of $E_c$ may be applied by changing the value of resistor R8. This control voltage is applied to the two sections of tube V1 through the networks composed of condenser C1 and resistor R6 and through condenser C2 and resistor R5, and, through variable resistor R9, to charge the variable condenser C3 in the sweep circuit. A gas tube V2 is provided in the sweep circuit to discharge condenser C3 through a limiting resistor R10. This tube is fired through a differentiating network comprising resistor R11 and condenser C4 from the voltage developed across cathode resistor R4. Two voltage dividing networks R12, R13 are included to provide proper bias for the tubes.

The control unit and the sweep circuit are supplied from a conventional, regulated power supply, indicated as a block in Fig. 2, and which is characterized by a low output impedance to insure that any transient currents generated by the tubes are sufficiently suppressed. This supply may also be used to furnish power to the other circuit elements shown in Fig. 2, with the exception of the CRO. The CRO block is intended to include its own high voltage supply. The output of the sweep circuit is obtained by sampling the voltage developed across condenser C3 and is applied to the vertical amplifier across terminal $E_s$. The pulses supplied to the trigger and marker circuits, described elsewhere, are obtained from the cathode of section A of tube V1 and applied to these circuits at terminal $E_t$.

It should be noted that the variability of resistor R8 is made linear and in practice this unit is made a part of the direct reading distance dial, whereby when the unit is properly focused, as will be described, the distance to the target may be directly obtained from the dial controlling this resistor.

The operation of the control unit may be quickly understood by assuming that section A of tube V1 is conducting. If so, condenser C1 will be charged through resistor R6 from the control voltage. As the charge accumulates on condenser C1, the grid of section B will become sufficiently positive to permit current to flow in the cathode-plate circuit of that tube, which action will drive the grid of section A negative to below cut-off voltage, until section A again fires, completing the operating cycle of the tube.

From this it is apparent that, once during each cycle of operation of tube V1, i. e., at the respective firing times of sections A, B, pulses will be supplied to the trigger and marker circuits, through terminal $E_t$, and to the grid of gas tube V2, through the associated differentiating network. The former pulse (from section A), through the trigger circuit, simultaneously causes the oscillator to emit a sound pulse into the output transducer, and through the marker circuit, causes a horizontal displacement of the CRO spot. The latter pulse (from section B) fires the gas tube V2, causing it to discharge condenser C3, which has received a charge from the control voltage. The vertical movement of the spot, through terminal $E_s$, is controlled by this charge and is thus recycled by the firing of the gas tube as controlled by the pulse supplied from tube V1.

Figure 3:
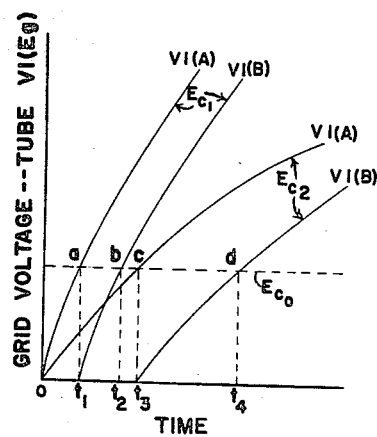
Fig. 3 is a graph of the grid voltage of the control multivibrator plotted against time for two specific control voltages.

In order to synchronize the operation of tubes V1 and V2, the RC constants of the networks composed of resistor R6 and condenser C1, resistor R5 and condenser C2, and resistor R9 and condenser C3 must be properly chosen. This is best understood by reference to Figs. 3 and 4, in which the grid voltages $E_{g1}$ and $E_{g2}$ of tubes V1 and V2 are respectively plotted against time, for given values of the control voltage $E_c$. In Fig. 3, it is seen that for a given value, $E_{c1}$ of control voltage, the grid voltage of one section of tube V1 rises exponentially along the curve $Oa$ until the cut-off voltage $E_{co}$ is reached at time $t_1$. Immediately, the grid of the other section starts to rise along a parallel curve $t_1b$ to $E_{co}$, which value is reached at time $t_2$. Thus, it is apparent that for the values chosen for the control voltage and for condensers C1, C2 and resistors R5, R6, $t_2$ is the time for a complete cycle of operation for tube V1.

Figure 4:
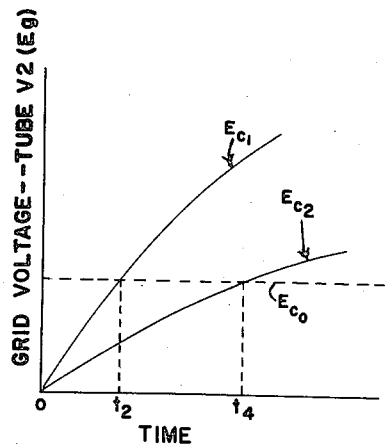
Fig. 4 is a similar graph of the grid voltage of the sweep circuit gas tube plotted against time for the same two control voltages used in Fig. 3.

If now, the RC constant of the network comprising resistor R9 and condenser C3, associated with tube V2, is chosen to be equal to the sum of the value of the RC constants of the networks comprising condensers C1, C2 and resistors R5, R6, it is seen, in Fig. 4, that the voltage across condenser C3 will rise to the same value, $E_{co}$, in the same time, $t_2$, taken for the tube V1 to complete its cycle. Thus, when the positive pulse from the cathode of section B of tube V1 fires tube V2, condenser C3 will have been charged to the same value, $E_{co}$, as condensers C1 and C2.

Likewise, if some other value of control voltage, such as $E_{c_2}$ is chosen, Figs. 3 and 4 show that this same relation holds. The RC constants of the networks associated with the tubes insures the firing of tube V2 at a new time $t_4$, when condenser C3 has been charged to the same value as condensers C1 and C2 which, in this case, charged along the lines $Oc$ and $t_3d$ of Fig. 3. Thus it is seen that, regardless of the magnitude of the control voltage $E_c$, the length of the vertical sweep on the CRO is the same because the condenser C3, whose charge controls the sweep, is always charged to exactly the same cut-off voltage $E_{co}$. Although the value of $E_g$ varies widely (as does the charging time), the CRO spot sweeps with constant amplitude under all conditions.

It is now seen that at the beginning of a cycle of operation of tubes V1, V2, condenser C3 begins to charge, causing the CRO spot to begin its vertical sweep. Halfway through the cycle, section A of tube V1 begins to conduct and applies a pulse to terminal $E_t$. This, in turn, causes the oscillator to apply a signal pulse to the output transducer and, simultaneously, to put a horizontal marker pip on the CRO screen, through the marker circuit. The condenser C3 continues to charge and the spot continues to move vertically upward until section B of tube V1 conducts, at which time, the spot flies back and begins a new sweep. On the receipt of the echo on the receiving transducer, which is amplified and applied to the horizontal deflection plates of the CRO, a second (echo) pip appears on the screen. By adjusting variable resistor R8, the control voltage may be given a magnitude just sufficient to charge the condenser C3 to the cut-off voltage in a time exactly equal to the transit time of the sound pulse. If the dial of resistor R8 is calibrated directly in distance, the distance through which the sound had traveled in this time may be read directly. When this occurs, the horizontal displacement on the CRO screen caused by the returning echo will occur at the same point and time as the pip put on the screen by the marker circuit. If the control voltage is too large, and condensers C1, C2, and C3 are charged too quickly, the echo pip will lag (i. e., be above) the marker pip on the screen, and vice versa. If this occurs, it is readily apparent and resistor R8 may be altered until the two pips overlap, at which occurrence, the depth may be read directly from the calibrated dial associated with resistor R8.

For successful operation, the manner of providing bias for the two tubes V1, V2 is of interest. From the curves of Figs. 3 and 4, it is obvious that, if the operation of the two tubes is to be properly synchronized, and since the condensers C1, C2, and C3 are charged from the same source of control voltage, each must begin to charge from the same reference voltage. This is novelly accomplished as described below.

For example, when section B of tube V1 is conducting, the voltage drop across condenser C1 is the difference between B+ and the potential on the grid of section B, which latter, because section B is conducting, is approximately equal to the voltage on the associated cathode. When section A fires, the voltage on the grid of section B drops considerably and it is from this new potential that condenser C1 must be charged from the source of control voltage $E_c$. By providing the tap on voltage divider R13, it is possible to insure that this voltage will be at the proper reference level. The condenser is charged at a rate as determined by the RC constants of the network of which it is a part and the potential difference across such network, i. e., the control voltage $E_c$ minus the reference voltage. If this tap were not provided, such potential difference would be greater by that same amount and would obviously charge the condenser C1 at a too rapid rate. As a result, the positive pulse supplied to tube V2 would occur before condenser C3 had received its full charge and the condensers C1, C3 would thus not be charged to the same value $E_{co}$, as required for synchronous operation.

Tube V2 is also provided with a small amount of bias which, if a pulse were not received from the cathode of section B of tube V1, would fire the tube when the potential across condenser C3 was slightly, but not much greater, than $E_{co}$. However, by the time the positive pulse is received from section B of tube V1, even a small reduction in the grid bias fires the tube substantially simultaneously with the firing of section B of tube V1. Operation of tubes V1, V2 is thus synchronized and the CRO spot sweeps at constant amplitude, independent of the cyclic frequency of the tubes.

In practice, it should be noted that the values of condensers C1, C2, C3 and resistors R5, R6, R9 are indicated as variable. These are not actually individually varied in the course of operation but are set to determine the operating range. In all cases, however, the relation between the RC constants of the three circuits must be maintained as discussed above. Additionally, in practice, and for the specific circuit shown in Fig. 2, the tap on variable resistor R13 is set at about 55 volts and the bias applied to tube V2 is approximately 6 volts.

The linear control afforded by variable resistor R8 is also of interest. For example, it is known that the frequency $f$ of operation of the multivibrator V1 is proportional to the applied control voltage $E_c$ for a certain range of $E_c$ utilized herein. Thus $$f = KE_c$$

where K is some constant, dependent upon the characteristics of the tube and its associated circuits. Since the frequency of operation is the reciprocal of the period T of its operation, the following may be written:

$$\frac{1}{T} = f = KE_c$$

Since $$E_c = \frac{E_b R_7}{R_7 + R_8}$$

where $E_b$ is the voltage of the power supply and $R_7$ and $R_8$ are the values of resistors R7 and R8, respectively, $$f = \frac{1}{T} = \frac{KE_b R_7}{R_7 + R_8}$$

$$T = \frac{1}{KE_b} + \frac{R_8}{KE_b R_7}$$

Since $E_b$ and $R_7$ do not vary, $$T = k + \frac{kR_8}{R_7}$$

$$T = k\left(1 + \frac{R_8}{R_7}\right)$$

where $$k = \frac{1}{KE_b}$$

Plotting T against the value of resistor R8, it is seen that a straight line is obtained with a slope $$\frac{k}{R_7}$$

and which passes through the point $k$, when $R_8$ is equal to 0. Since the distance to the target is directly proportional to the period T, it is obvious that the linearly calibrated dial associated with resistor R8 gives correct readings of distance.

Suitable values of the various components comprising the control unit and sweep circuit while operating at a frequency of 80 kc. and measuring ranges from 6 to 600 feet are listed below. It is to be clearly understood that for other operating ranges and frequencies, other and similar elements and values could be used, all of which will be obvious to those skilled in the art.

| | | |
|---|---|---|
| R1 | ohms | 25,000 |
| R2 | do | 25,000 |
| R3 | do | 5,000 |
| R4 | do | 5,000 |
| R5 | do | 1,250,000 |
| R6 | do | 1,250,000 |
| R7 | do | 35,000 |
| R8 | do | 100,000 |
| R9 | do | 1,000,000 |
| R10 | do | 100 |
| R11 | do | 100,000 |
| R12 | do | 50,000 |
| R13 | do | 40,000 |
| C-1 | mfd | .002–.06 |
| C-2 | mfd | .002–.06 |
| C-3 | mfd | .002–.06 |
| C-4 | mfd | .001 |
| V1 | type 6SL7 (duotriode) | |
| V2 | type 884 | |
| Power supply | volts | 300 |

Having described my invention, I claim:

1. A pulse-echo locator system having a transmitter responsive to a keying pulse to emit a transmitted pulse, a receiver for receiving reflected pulses and an indicator for indicating the time interval between said transmitted pulse and said reflected pulse, a control unit for said system including a synchronizing means for generating a series of time measuring pulses, circuit means connecting said control unit and said transmitter for delivering a keying pulse to said transmitter at the mid-point of a time measuring interval, circuit means connecting said control unit to said indicator for delivering a marker pulse coincident with said keying pulse to said indicator, means connecting said receiver to said indicator for indicating the reception of a reflected pulse, and an adjustable linear control means including dial means connected to said control unit for controlling the time interval of the time measuring pulses, whereby the time interval between said keying pulses may be adjusted to be equal to the transit time of a reflected echo pulse and said interval indicated upon said dial means.

2. A pulse-echo locator system including a transmitter responsive to a keying pulse to emit a transmitted pulse, a receiver for receiving reflected pulses and an indicator for indicating the time interval between said transmitted pulses and said reflected pulses, a control unit for said system including a synchronizing means for generating a series of time measuring pulses, circuit means connecting said control unit to said transmitter for delivering a keying pulse to said transmitter at the mid-point of a time measuring interval, circuit means connecting said control unit to said indicator for delivering a marker pulse coincident with said keying pulse to said indicator, means connecting said receiver to said indicator for indicating the reception of a reflected pulse, a linear control means connected to said control unit for controlling the time interval between the keying pulses, and calibration means including dial means on said linear control means for indicating distance between the system and an echo object in dependence on the duration of the time interval.

3. In a pulse-echo locator system including a transmitter responsive to a keying pulse to emit a transmitted pulse, a receiver for receiving reflected pulses, and a cathode ray indicator having a time base sweep initiated by a start pulse and connected to said receiver to indicate said reflected pulses thereon, a synchronizing unit comprising a variable frequency multivibrator means for producing start pulses at an adjustable repetition rate, means for impressing said start pulses on said time base sweep of said cathode ray indicator, circuit means for producing keying pulses mid-way between said start pulses, means for impressing said keying pulses on said transmitter, circuit means for impressing reference pulses coincident with said keying pulses on said indicator, and calibration means including dial means connected to said multivibrator means to indicate the time interval between said start pulses and therefore the range to the target, whereby the reference pulses and the reflected pulses may be made to coincide when the repetition rate equals the transit time of said transmitted pulse and said reflected pulse.

DAVID H. RANSOM, Jr.

References Cited in the file of this patent

UNITED STATES PATENTS

| Number | Name | Date |
|---|---|---|
| 1,709,573 | Hayes | Apr. 16, 1929 |
| 1,739,901 | Grimes | Dec. 17, 1929 |
| 1,983,254 | Turner | Dec. 4, 1934 |
| 2,143,035 | Smith | Jan. 10, 1939 |
| 2,227,598 | Lyman et al. | Jan. 7, 1941 |
| 2,333,688 | Shepard | Nov. 9, 1943 |

FOREIGN PATENTS

| Number | Country | Date |
|---|---|---|
| 490,599 | Great Britain | Aug. 16, 1933 |
| 113,233 | Australia | June 12, 1941 |